(12) United States Patent
Tang et al.

(10) Patent No.: US 12,744,365 B2
(45) Date of Patent: Sep. 22, 2026

(54) ISOLATION DEVICE FOR VOLTAGE TRANSFORMER CABINET

(71) Applicant: Schneider Electric Industries SAS, Rueil-Malmaison (FR)

(72) Inventors: Min Tang, Shanghai (CN); Yigang Zhou, Shanghai (CN); Haifeng Lu, Shanghai (CN); Yinzhong Que, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 104 days.

(21) Appl. No.: 18/406,552

(22) Filed: Jan. 8, 2024

(65) Prior Publication Data

US 2024/0243559 A1 Jul. 18, 2024

(51) Int. Cl.

| | |
|---|---|
| ***H02B 11/04*** | (2006.01) |
| ***H02B 1/21*** | (2006.01) |
| ***H02B 1/32*** | (2006.01) |
| ***H02B 11/28*** | (2006.01) |

(52) U.S. Cl.

CPC ............... *H02B 11/04* (2013.01); *H02B 1/21* (2013.01); *H02B 1/32* (2013.01); *H02B 11/28* (2013.01)

(58) Field of Classification Search

CPC ........ H01H 31/003; H01H 31/28; H02B 1/21; H02B 1/32; H02B 11/04; H02B 11/28; H02B 13/0356

See application file for complete search history.

(56) References Cited

U.S. PATENT DOCUMENTS

2016/0049775 A1* 2/2016 Saxegaard ............... H01H 1/44 361/618
2021/0142968 A1* 5/2021 Yang .................. H02B 13/0356

FOREIGN PATENT DOCUMENTS

CN 110752103 A * 2/2020 ............. H01H 1/221
KR 200377717 Y1 * 3/2005 ......... H02B 13/0356
WO 2020019335 A1 1/2020

* cited by examiner

*Primary Examiner* — Timothy J Thompson
*Assistant Examiner* — Rhadames Alonzo Miller
(74) *Attorney, Agent, or Firm* — FIG. 1 Patents

(57) ABSTRACT

The present disclosure discloses an isolation device for a voltage transformer cabinet including a drive shaft; a conductive ring sleeved and fixed to the drive shaft; a movable guide rod fixed to the drive shaft and the conductive ring to swing along with a rotation of the drive shaft and electrically connected with the conductive ring; a fixing post fixedly connected to the voltage transformer; a contact, installed to the fixing post through a compression spring and electrically connected with the fixing post, and keeping in electrical contact with the conductive ring under an action of the compression spring; a closing stationary contact; and a grounded stationary contact, the rotation of the drive shaft drives the movable guide rod to swing between on position in which the movable guide rod contacts the closing stationary contact and grounded position in which the movable guide rod contacts the grounded stationary contact.

14 Claims, 9 Drawing Sheets

ISOLATION DEVICE FOR VOLTAGE TRANSFORMER CABINET

TECHNICAL FIELD

The present disclosure relates to an isolation device for voltage transformer cabinet and a voltage transformer cabinet including the isolation device.

BACKGROUND

At present, for some gas-insulated voltage transformer cabinets, voltage transformers are installed on the feeder side, and for some gas-insulated voltage transformer cabinets, voltage transformers are installed on the busbar side, but most of the gas-insulated voltage transformer cabinets do not have isolation devices. At present, if isolation devices need to be added to some busbar-side voltage transformer cabinets, an extra small gas box needs to be placed at the top of the cabinet on the busbar side, so that the height of the whole cabinet will increase. Other busbar-side voltage transformer cabinets with isolation devices do not need to add additional small gas boxes, but the isolation devices are arranged close to the feeder bushing, and the operating mechanism for operating the isolation device can only be arranged in the cable chamber like the feeder-side voltage transformer cabinets with isolation devices, and the operating mechanism can only be operated after opening the door of the cable chamber. It is needed to develop a new isolation device that can be applied to voltage transformer cabinets on both busbar side and feeder side to overcome one or more of the above shortcomings.

SUMMARY

In view of the above problems, according to one aspect of the present disclosure, an isolation device for a voltage transformer cabinet is proposed. The isolation device is installed in an inflation chamber of the voltage transformer cabinet and configured to switch a voltage transformer between an on state and a grounded state, and includes: a drive shaft, rotatably installed to the inflation chamber; a conductive ring, sleeved and fixed to the drive shaft; a movable guide rod, fixed to the drive shaft and the conductive ring to swing along with a rotation of the drive shaft and electrically connected with the conductive ring; a fixing post, fixedly connected to the voltage transformer; a contact, installed to the fixing post through a compression spring and electrically connected with the fixing post, and keeping in electrical contact with the conductive ring under an action of the compression spring; a closing stationary contact, fixed to a closing bushing; and a grounded stationary contact, fixed to a grounding circuit, the rotation of the drive shaft drives the movable guide rod to swing between an on position and a grounded position, in the on position, the movable guide rod contacts and conducts with the closing stationary contact, and the voltage transformer is in the on state; in the grounded position, the movable guide rod contacts and conducts with the grounded stationary contact, the voltage transformer is in the grounded state.

The isolation device for voltage transformer cabinets according to the present disclosure has the following advantages: the isolation device according to the present disclosure can be used for both busbar-side voltage transformer cabinets and feeder-side voltage transformer cabinets in the same structure. That is to say, the isolation device according to the present disclosure can be installed close to the busbar bushing to increase the isolation function for the busbar-side voltage transformer cabinet, and can also be installed close to the feeder bushing to increase the isolation function for the feeder-side voltage transformer cabinet. Therefore, for manufacturers, the number of parts can be reduced and the cost can be reduced. Such a structure occupies a small space, can be arranged in the inflation chamber, does not need to add an additional small gas box, and also allows the operating mechanism to be installed in the mechanism chamber in front of the cabinet.

The isolation device for the voltage transformer cabinet according to the present disclosure can have one or more of the following features.

According to an embodiment, the isolation device is suitable for being installed close to a busbar bushing and suitable for being installed close to a feeder bushing. The isolation device can be installed at different positions in the cabinet according to the requirements, so as to realize isolation function of different sides.

According to an embodiment, the movable guide rod is a round rod, and the closing stationary contact and the grounded stationary contact respectively include conductive spring pieces, a gap between the conductive spring pieces is slightly smaller than a diameter of the movable guide rod, so that when the movable guide rod swings close to the conductive spring pieces, the movable guide rod slides into the gap, spreads the conductive spring pieces and keeps in contact with the conductive spring pieces. This contact mode is reliable, and favorable for the flow of current.

According to an embodiment, the drive shaft is provided with a radial through hole; the conductive ring is provided with a threaded through hole radially opened and a blind hole radially opposite to the threaded through hole and opened towards the threaded through hole; the movable guide rod is a round rod, and includes a contact end configured to contact with the closing stationary contact or the grounded stationary contact and a fixed end opposite to the contact end, a threaded section is arranged at a distance from the fixed end, the movable guide rod simultaneously passes through the threaded through hole of the conductive ring and the radial through hole of the drive shaft, the threaded section is connected with the threaded through hole in a matching way, and the movable guide rod passes through the fixed end of the drive shaft and is clamped into the blind hole of the conductive ring. This fixing mode is stable and reliable, and at the same time realizes the transmission of motion and electricity.

According to an embodiment, a diameter of a fixed section between the threaded section and the fixed end is smaller than a diameter of the contact end, which can not only ensure the rigidity of the contact end and meet the contact requirements between the contact end and the stationary contact, but also design the dimensions of the conductive ring and the drive shaft smaller.

According to an embodiment, the closing bushing is a busbar bushing, the isolation device is installed close to the busbar bushing; or, the closing bushing is a feeder bushing, the isolation device is installed close to the feeder bushing. Different voltage transformer cabinets with isolation function can be formed by installing the isolation device suitable for both busbar side and feeder side in appropriate positions as required.

According to an embodiment, the isolation device further includes a compression spring shield, the compression spring shield is installed between the contact and the fixing post and shields the compression spring, which can realize an electric filed shielding function.

According to an embodiment, the isolation device further includes a closing contact shield surrounding and shielding the closing stationary contact and/or a grounded contact shield surrounding and shielding the grounded stationary contact, which can realize an electric filed shielding function.

According to an embodiment, three conductive rings and three movable guide rods are spaced apart and fixed on the drive shaft. So that, they can correspond to the three phases.

According to an embodiment, the fixing post is fixed to a transformer bushing connected with the voltage transformer or a connection copper bar connected with the transformer bushing. Different connections can be designed according to the position.

According to another aspect of the present disclosure, a voltage transformer cabinet is proposed and includes a voltage transformer and the abovementioned isolation device, which is connected to the voltage transformer.

According to an embodiment, the inflation chamber is filled with dry air, and the voltage transformer cabinet has same height, width and depth with an electrical cabinet filled with SF6 gas and having no voltage transformer isolation function. Therefore, the isolation device for the voltage transformer cabinet according to the present disclosure can be installed in the original electrical cabinet without isolation function, so as to realize the isolation function.

BRIEF DESCRIPTION OF DRAWINGS

In order to explain the technical solution of the embodiment of the present disclosure more clearly, the accompanying drawings of the embodiment of the present disclosure will be briefly introduced below. Among them, the accompanying drawings are only used to show some embodiments of the present disclosure, and are not limited to all embodiments of the present disclosure.

LIST OF REFERENCE NUMERALS

Figure 1:
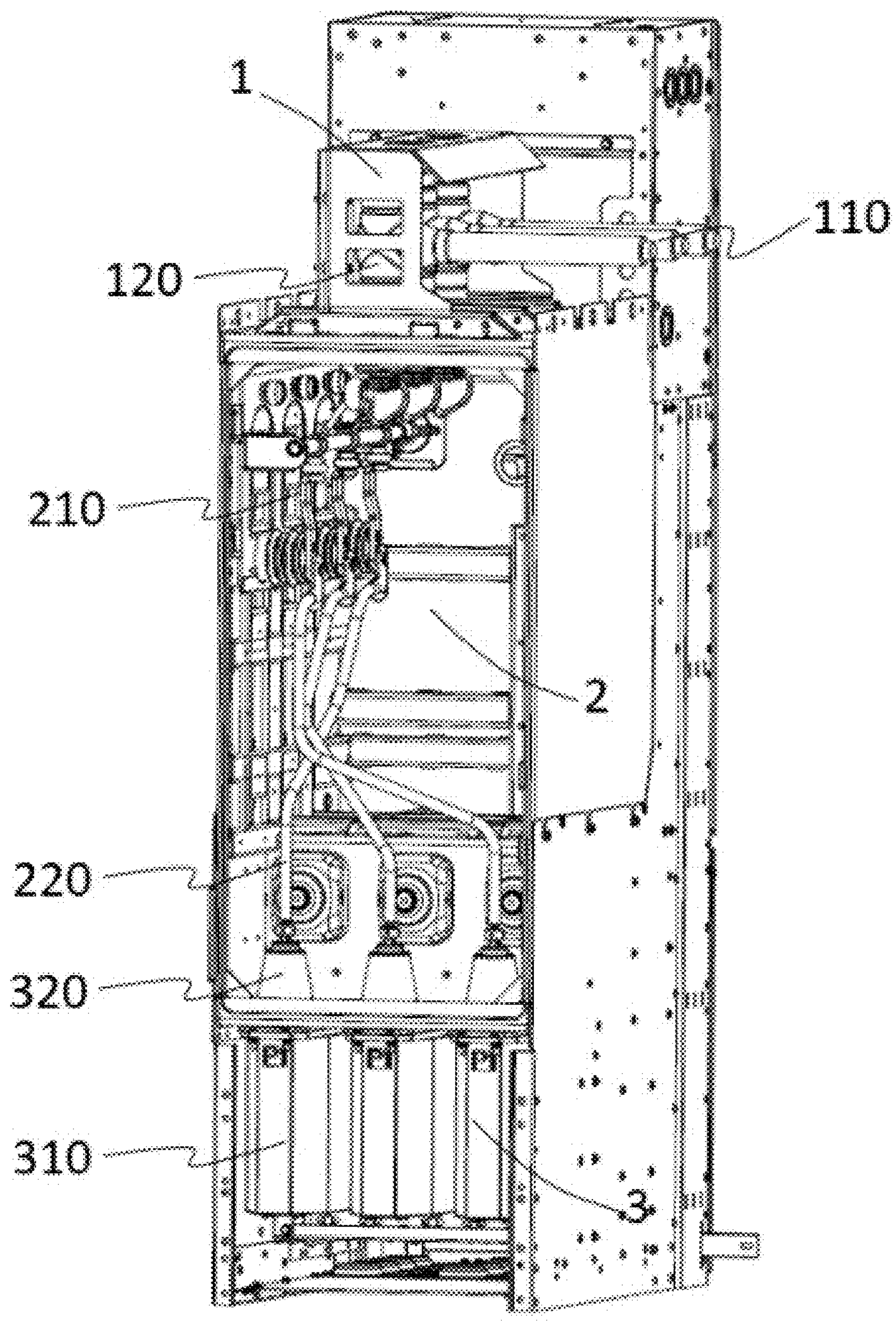
FIG. 1 is a perspective view of a busbar-side voltage transformer cabinet according to an embodiment of the present disclosure.

1—busbar chamber
110—busbar
120—busbar bushing
2—inflation chamber
210—isolation device
211—drive shaft
2111—radial through hole
212—conductive ring
2121—threaded through hole
2122—blind hole
213—movable guide rod
2131—contact end
2132—fixed end
2133—thread section
2134—fixed section
214—fixing post
215—contact
216—closing stationary contact
2161—contact shield
217—grounded stationary contact
218—conductive spring piece
219—compression spring
2191—compression spring shield
220—hard copper rod
3—cable chamber
310—voltage transformer
320—transformer bushing
4—mechanism chamber
410—operating mechanism
510—feeder bushing

DETAILED DESCRIPTION

In order to make the purpose, technical solution and advantages of the technical solution of the present disclosure more clear, the technical solution of the embodiment of the present disclosure will be described clearly and completely with the accompanying drawings of the specific embodiments of the present disclosure. Like reference numerals in the drawings represent like parts. It should be noted that the described embodiments are a part of the embodiments of the present disclosure, not the whole embodiment. Based on the described embodiments of the present disclosure, all other embodiments obtained by ordinary skilled in the art without creative labor belong to the protection scope of the present disclosure.

Unless otherwise defined, technical terms or scientific terms used here shall have their ordinary meanings as understood by people with ordinary skills in the field to which this present disclosure belongs. The "first", "second" and similar words used in the specification and claims of the present disclosure patent application do not indicate any order, quantity or importance, but are only used to distinguish different components. Similar words such as "including" or "containing" refer to that the elements or objects appearing before the word cover the elements or objects listed after the word and their equivalents, without excluding other elements or objects. Similar words such as "connecting" or "connected" are not limited to physical or mechanical connection, but can include electrical connection, whether direct or indirect. "Up", "down", "left" and "right" are only used to indicate the relative positional relationship. When the absolute position of the described object changes, the relative positional relationship may also change accordingly.

Hereinafter, the present disclosure will be described in detail by describing example embodiments.

Figure 2:
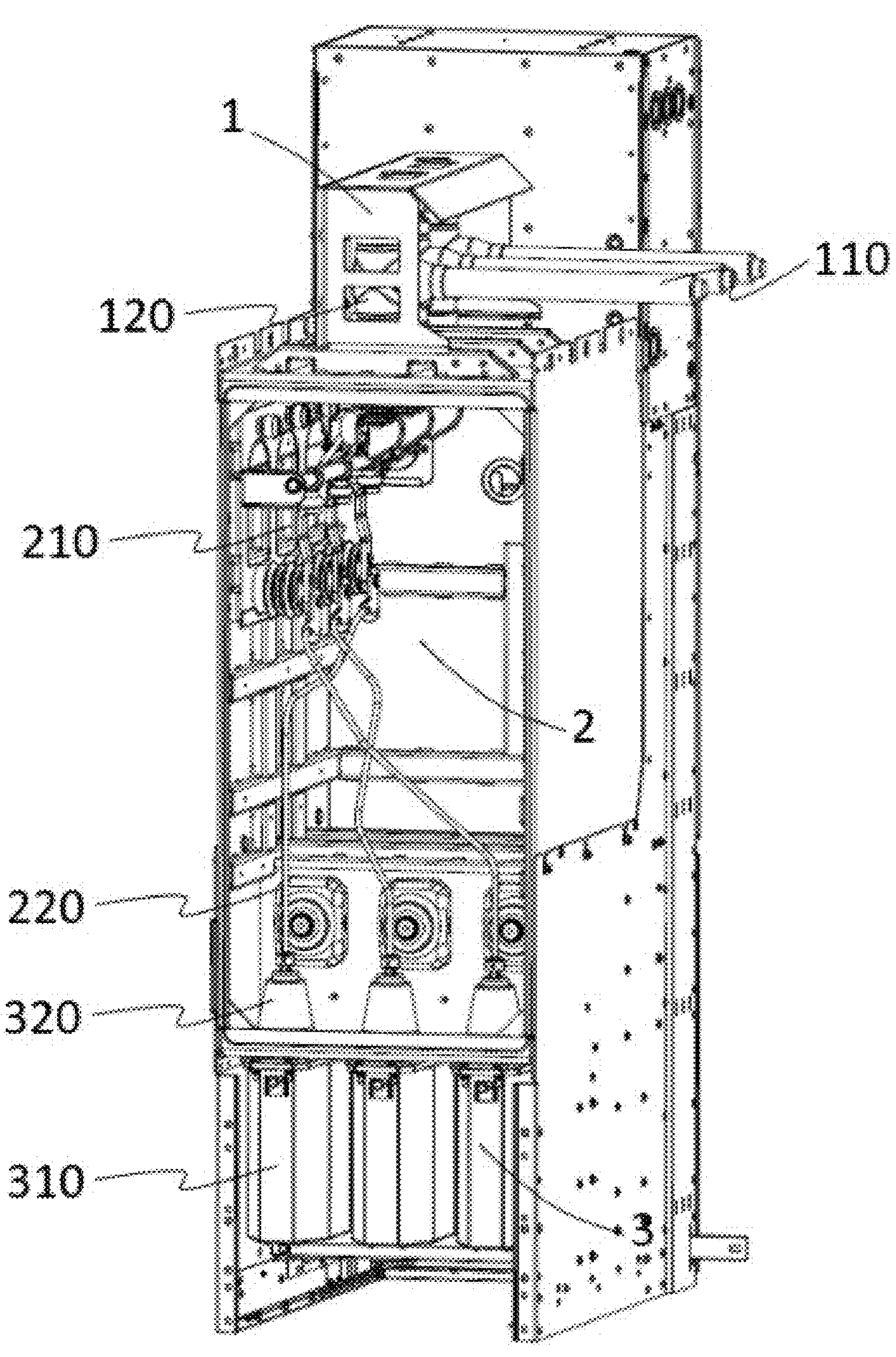
FIG. 2 is a perspective view of a busbar-side voltage transformer cabinet according to another embodiment of the present disclosure.

FIGS. 1 and 2 are busbar-side voltage transformer cabinets according to two embodiments of the present disclosure, respectively. As illustrated by FIGS. 1 and 2, the busbar-side voltage transformer cabinet includes a busbar chamber 1 located above, a cable chamber 3 located below, and an inflation chamber 2 located between the busbar chamber 1 and the cable chamber 3. The busbar 110 is installed in the busbar chamber 1, and the busbar 110 includes, for example, three solid busbars. Feeders are installed in the cable chamber 3, and there are three feeders, for example. The inflation chamber 2 is filled with insulating gas, which can be SF6 or dry air, preferably environmentally friendly dry air. An electrical device (not shown) is installed in the inflation chamber 2, which is a circuit breaker in FIG. 1 and an isolation switch in FIG. 2.

A voltage transformer 310 is arranged in the busbar-side voltage transformer cabinet according to the present disclosure, and the voltage transformer 310 is installed in the cable chamber 3. An additional isolation device 210 is installed in the inflation chamber 2, and the isolation device 210 is configured to switch the voltage transformer 310 between an on state and a grounded state. In the on state, the voltage transformer 310 is connected with the busbar 110, that is, the voltage transformer 310 is connected with a main circuit; in the grounded state, the voltage transformer 310 is connected to a grounding circuit, that is, the voltage transformer 310 is isolated from the main circuit. The isolation device 210 can connect the voltage transformer 310 with the busbar 110, and can also ground the voltage transformer 310, which can not only make it unnecessary for customers to disassemble the voltage transformer 310 when doing insulation tests of cables and the like on site, but also enable the electrical cabinet to be put into operation quickly after a short-term fault of the voltage transformer 310, and further greatly reduce the power outage time when repairing or replacing the voltage transformer 310.

The busbar-side voltage transformer cabinet according to the present disclosure can save space without adding additional small gas box. Compared with the electrical cabinet filled with SF6 gas and without voltage transformer isolation function, the busbar-side voltage transformer cabinet filled with dry air according to the present disclosure has the same height, width and depth. That is to say, the isolation device 210 of the busbar-side voltage transformer cabinet according to the present disclosure can be installed in the original electrical cabinet without isolation function, so as to realize the isolation function.

Figure 5:
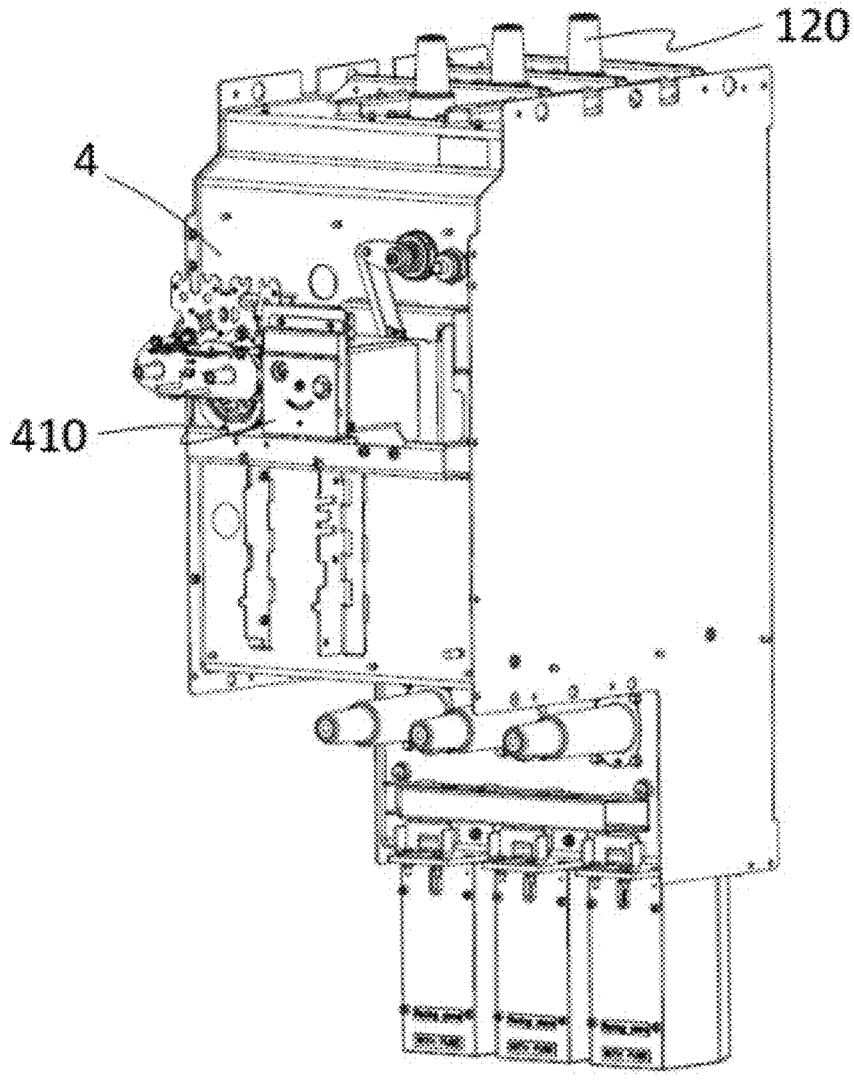
FIG. 5 is a perspective view of a mechanism chamber of a busbar-side voltage transformer cabinet according to an embodiment of the present disclosure.

As illustrated by FIG. 5, the busbar-side voltage transformer cabinet according to the present disclosure further includes a mechanism chamber 4, which is arranged outside the inflation chamber 2, that is, close to the user side, and the user can approach the mechanism chamber 4 from the outside. An operating mechanism 410 for operating the isolation device 210 is provided in the mechanism chamber 4. Through the operation of the operating mechanism 410, for example, by the user rotating an operating handle to different specific positions, the isolation device 210 will be driven to correspond different specific positions, so that the voltage transformer 310 can be switched between the on state and the grounded state. Because the operating mechanism 410 for operating the isolation device 210 is fixed in the mechanism chamber 4 outside the busbar-side voltage transformer cabinet, but not in the cable chamber 3, it is not necessary to open the door of the cable chamber 3 for further operation, which is convenient for users.

Referring back to FIGS. 1 and 2, the busbar chamber 1 is also provided with a busbar bushing 120 connected to the busbar 110, which extends from the busbar chamber 1 into the inflation chamber 2, and the isolation device 210 is arranged close to the busbar bushing 120. As mentioned above, the voltage transformer 310 is arranged in the cable chamber 3, the transformer bushing 320 connected with the voltage transformer 310 extends from the cable chamber 3 into the inflation chamber 2, and the isolation device 210 located in the inflation chamber 2 is connected with the transformer bushing 320 through the hard copper rod 220, thus being connected with the voltage transformer 310. The hard copper rod 220 is sheathed with silicone rubber, for example. In FIG. 1 and FIG. 2, the arrangement of the hard copper rod 220 is different due to the different structures and space occupied in the inflation chamber 2 of the circuit breaker and the isolation switch.

Figure 3:
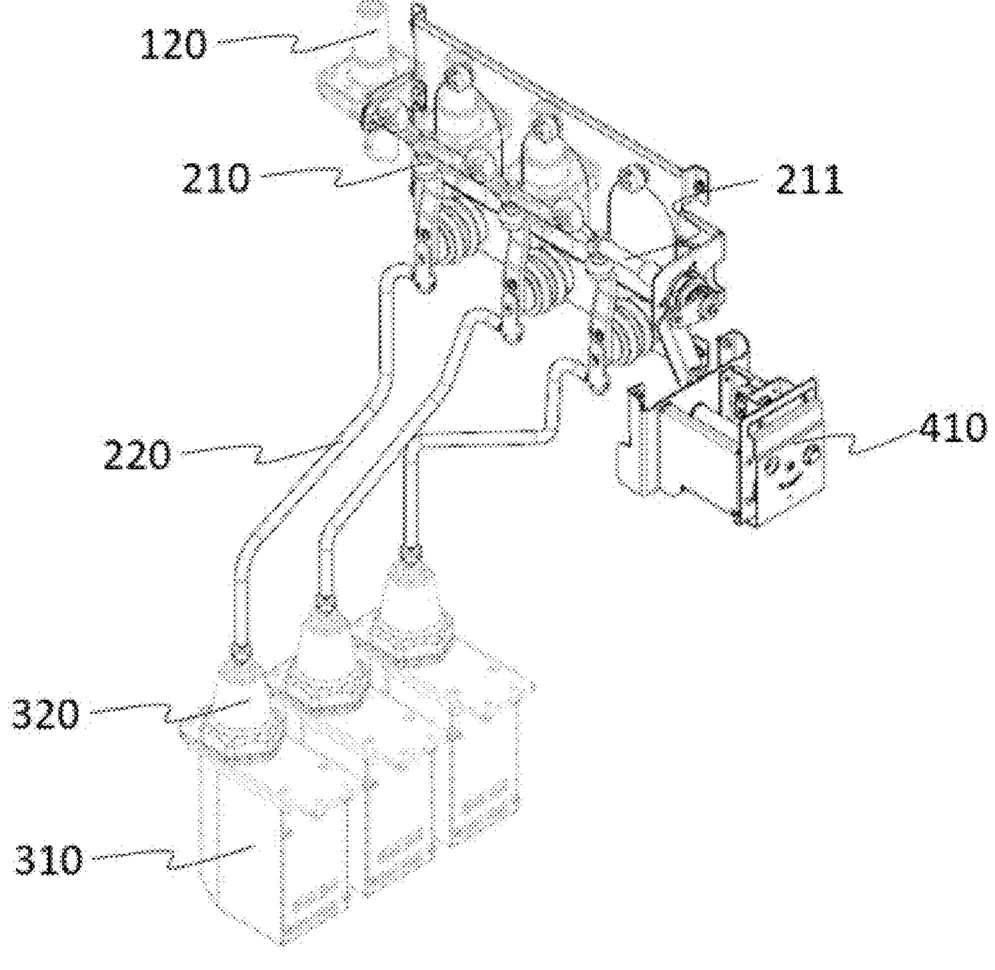
FIG. 3 is an internal perspective view of a busbar-side voltage transformer cabinet according to an embodiment of the present disclosure.
Figure 4:
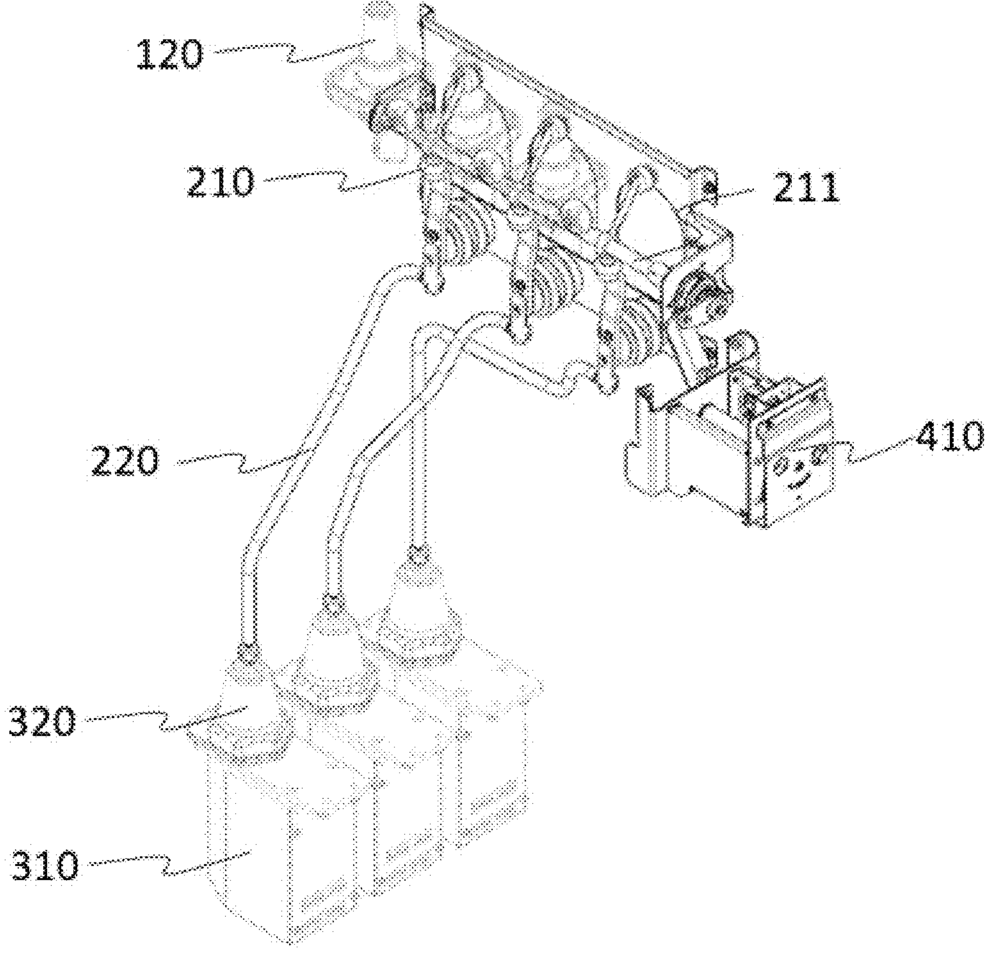
FIG. 4 is an internal perspective view of a busbar-side voltage transformer cabinet according to another embodiment of the present disclosure.

FIGS. 3 and 4 show the structure of the isolation device 210 and the connection relationship between the isolation device 210 and other components in the busbar-side voltage transformer cabinet according to different embodiments of the present disclosure, and the partitions between the chambers are omitted for clarity. The difference between FIG. 3 and FIG. 4 lies in that, FIG. 3 corresponds to FIG. 1, the electrical device is a circuit breaker, and FIG. 4 corresponds to FIG. 2, the electrical device is an isolation switch. The isolation device 210 includes a drive shaft 211, the drive shaft 211 is connected to the operating mechanism 410. For example, the drive shaft 211 is connected to a rotating shaft of a sealing flange, the rotating shaft of the sealing flange is connected to the operating mechanism 410 through a driving crank arm and a connection plate. The operating mechanism 410 can actuate the drive shaft 211 to rotate between a first shaft position and a second shaft position, in the first shaft position, a movable contact of the isolation device 210 contacts and conducts with a closing stationary contact provided on the busbar bushing 120, so that the voltage transformer 310 is connected with the busbar bushing 120 and then with the busbar 110, and, in the second shaft position, the movable contact of the isolation device 210 contacts and conducts with a grounded stationary contact, so that the voltage transformer 310 is grounded.

Figure 6:
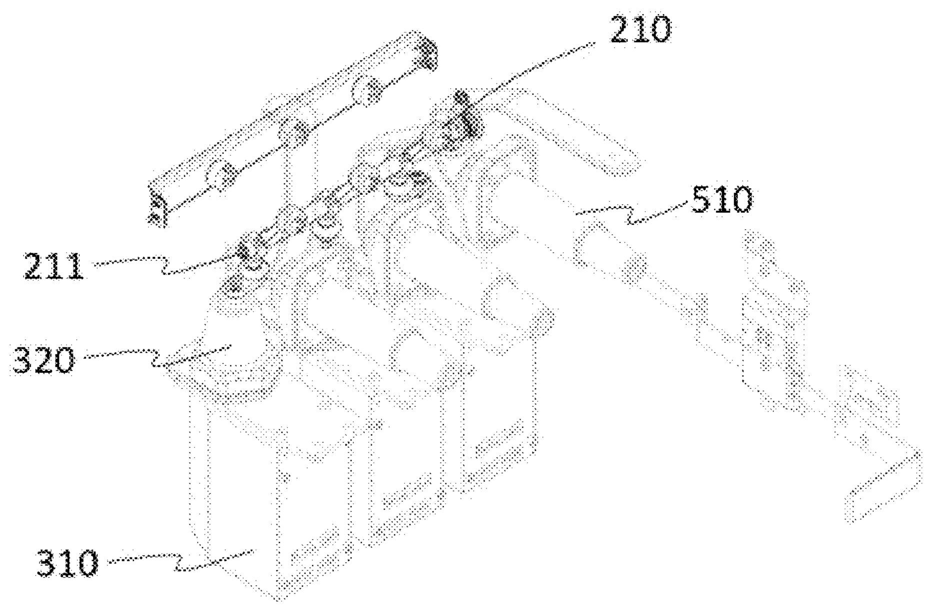
FIG. 6 is an internal perspective view of a feeder-side voltage transformer cabinet according to an embodiment of the present disclosure.
Figure 7:
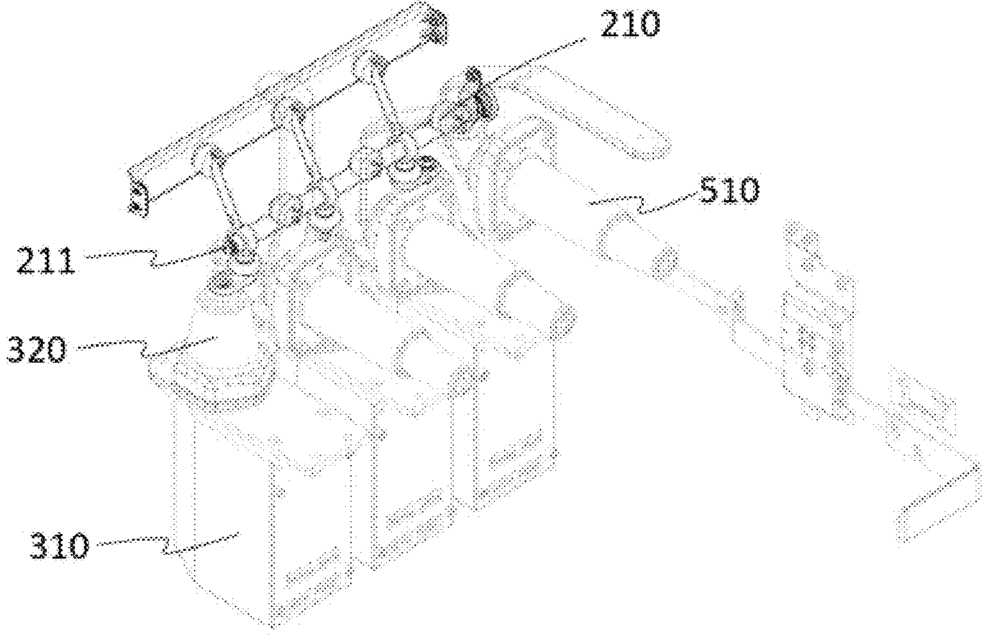
FIG. 7 is another internal perspective view of a feeder-side voltage transformer cabinet according to an embodiment of the present disclosure.

FIGS. 6 and 7 are internal perspective views of the feeder-side voltage transformer cabinet according to an embodiment of the present disclosure, showing the structure of the isolation device 210 and the connection relationship between the isolation device 210 and other components of the feeder-side voltage transformer cabinet, and partitions of the chambers are omitted for clarity. The difference between FIG. 6 and FIG. 7 lies in that, in FIG. 6, the voltage transformer is in the on state, and in FIG. 7, the voltage transformer is in the grounded state. The isolation device 210 of the feeder-side voltage transformer cabinet includes a drive shaft 211, the drive shaft 211 can rotate between a first shaft position and a second shaft position. In the first shaft position, the movable contact of the isolation device 210 contacts and conducts with the closing stationary contact 216 arranged on the feeder bushing 510, so that the voltage transformer 310 is connected with the feeder bushing 510 and further connected with the feeder. In the second shaft position, the movable contact of the isolation device 210 contacts and conducts with the grounded stationary contact 217, so that the voltage transformer 310 is grounded.

Figure 8:
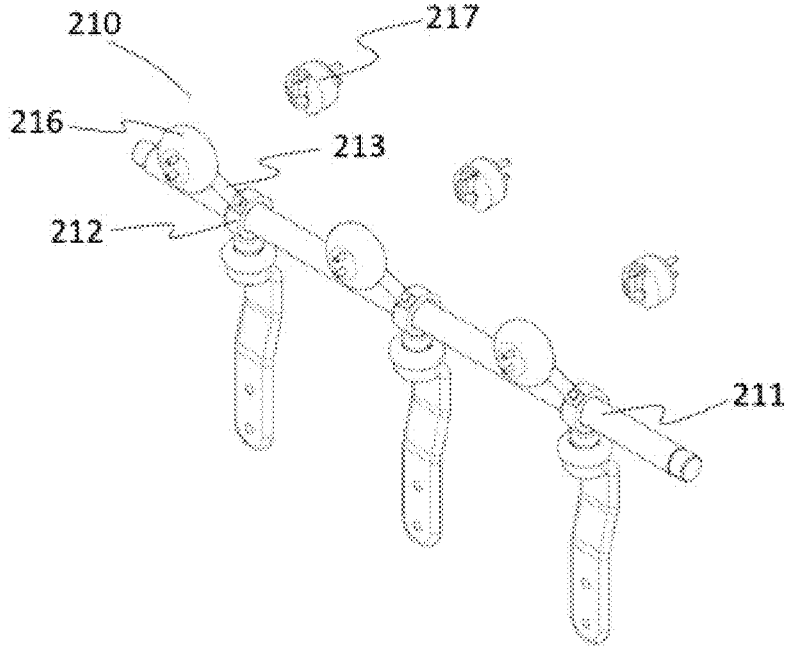
FIG. 8 is a perspective view of an isolation device of a busbar-side voltage transformer cabinet according to an embodiment of the present disclosure.
Figure 9:
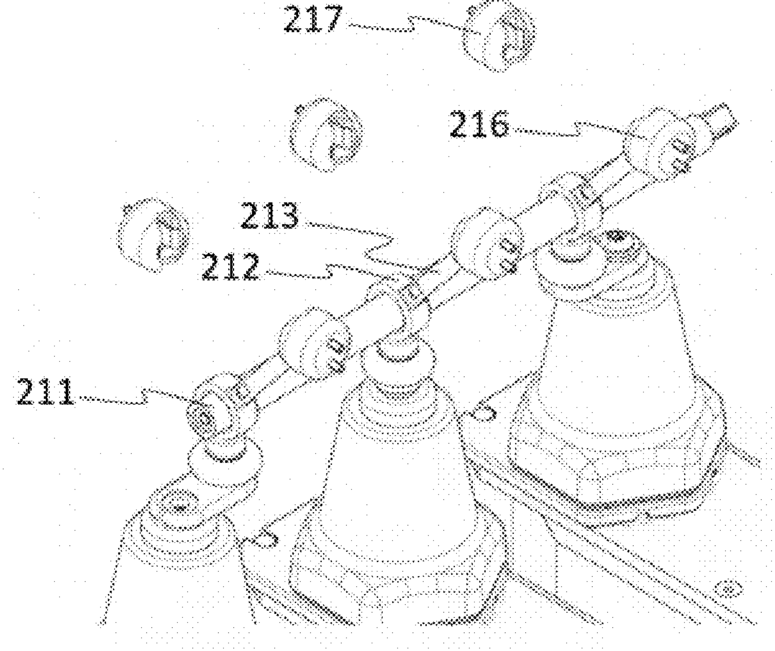
FIG. 9 is a perspective view of an isolation device of a feeder-side voltage transformer cabinet according to an embodiment of the present disclosure.
Figure 10:
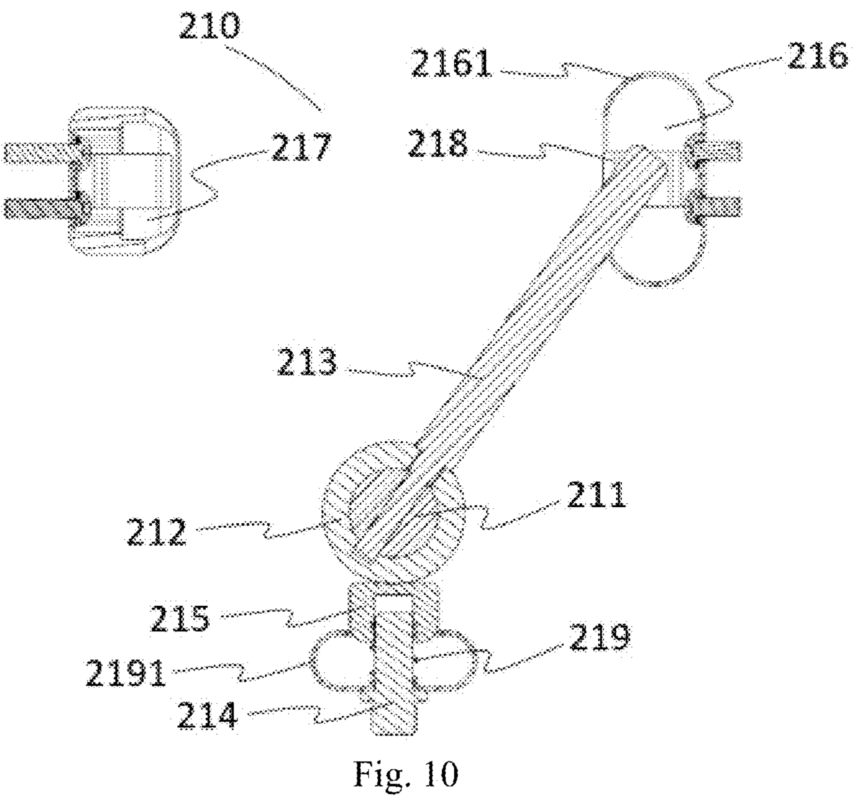
FIG. 10 is a sectional view of an isolation device of a busbar-side voltage transformer cabinet according to an embodiment of the present disclosure.

The structure of the isolation device 210 in the busbar-side voltage transformer cabinet is more specifically referred to FIGS. 8 and 10. The structure of the isolation device 210 in the feeder-side voltage transformer cabinet is more specifically referred to FIGS. 9 and 11. Because the isolation device 210 for the busbar-side voltage transformer cabinet has the same structure as the isolation device 210 for the feeder-side voltage transformer cabinet, the isolation device 210 will be described in the following.

In addition to the above-mentioned drive shaft 211, the isolation device 210 also includes a conductive ring 212, the conductive ring 212 is sleeved and fixed to the drive shaft 211. As illustrated by FIG. 8, three spaced conductive rings 212 are sleeved on the drive shaft 211. Each conductive ring 212 is fixed with a movable guide rod 213, the movable guide rod 213 swings with the rotation of the drive shaft 211 and is electrically connected with the conductive ring 212. The connection mode between the movable guide rod 213 and the conductive ring is not limited. Preferably, in the embodiment of FIGS. 10-13, the drive shaft 211 is provided with a radial through hole 2111; the conductive ring 212 includes a threaded through hole 2121 radially opened and a blind hole 2122 radially opposite to and opened towards the threaded through hole 2121. The movable guide rod 213 is a round rod, including a contact end 2131 configured to contact with the stationary contact and a fixed end 2132 opposite to the contact end 2131, and a threaded section 2133 at a distance from the fixed end 2132. The movable guide rod 213 passes through the threaded through hole 2121 of the conductive ring 212 and the radial through hole 2111 of the drive shaft 211 at the same time. The threaded section 2133 of the movable guide rod 213 is connected with the threaded through hole 2121 of the conductive ring 212 in a matching way, the movable guide rod 213 passes through the fixed end 2132 of the drive shaft 211 and is clamped into the blind hole 2122 of the conductive ring 212, so that the movable guide rod 213 can be fixed with the drive shaft 211 and the conductive ring 212 and electrically connected with the conductive ring 212. Preferably, a diameter of the fixed section 2134 between the threaded section 2133 and the fixed end 2132 is smaller than that of the contact end 2131, which can not only ensure the rigidity of the contact end 2131 and meet the contact requirements between the contact end 2131 and the stationary contact, but also design the dimensions of the conductive ring 212 and the drive shaft 211 smaller.

Figure 11:
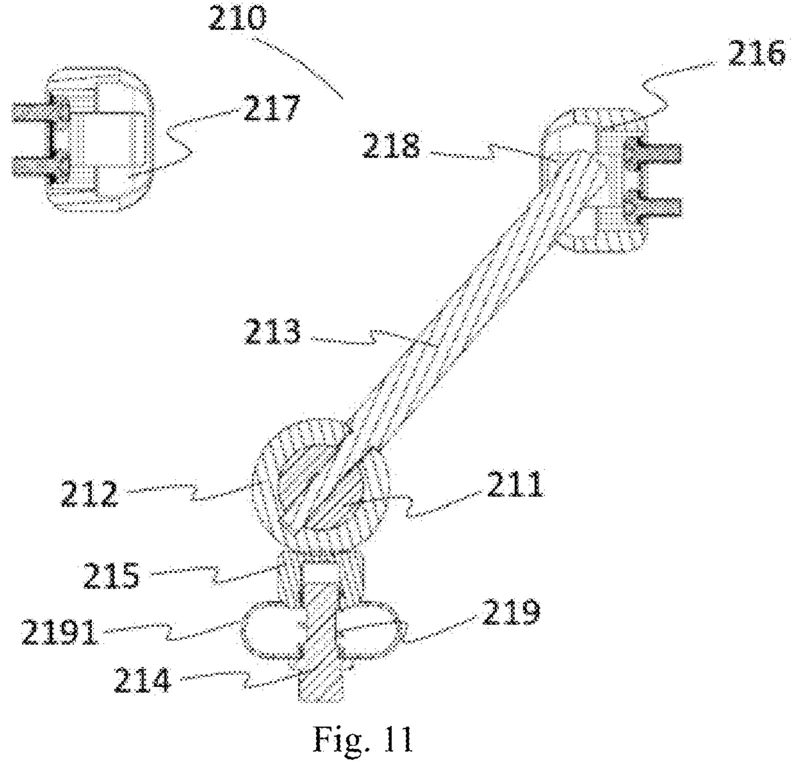
FIG. 11 is a sectional view of an isolation device of a feeder-side voltage transformer cabinet according to an embodiment of the present disclosure.
Figure 12:
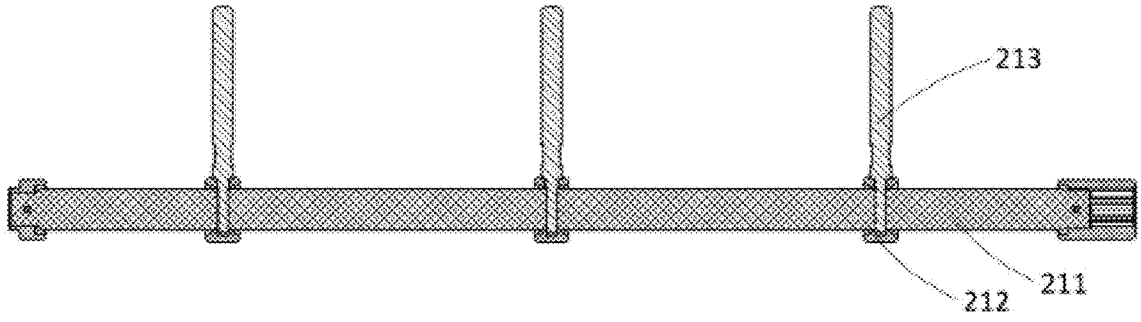
FIG. 12 is a sectional view of an isolation device according to an embodiment of the present disclosure.
Figure 13:
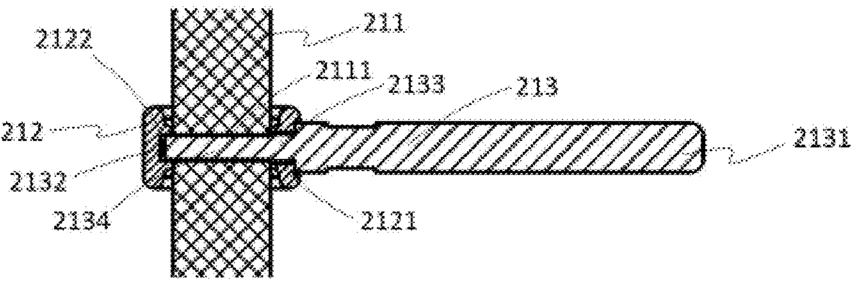
FIG. 13 is a partially enlarged cross-sectional view of an isolation device according to an embodiment of the present disclosure.

The isolation device 210 further includes a fixing post 214, the fixing post 214 is fixedly connected to the voltage transformer 310, for example, the fixing post 214 is fixed to a transformer bushing 320 connected to the voltage transformer 310 or a connection copper bar connected to the transformer bushing 320, as illustrated by FIGS. 8 and 9. The isolation device 210 also includes a contact 215. As illustrated by FIGS. 10 and 11, the contact 215 is installed to and electrically connected with the fixing post 214 through a compression spring 219, and keeps in electrical contact with the conductive ring 212 under the action of the compression spring 219, that is, one end of the compression spring 219 abuts against a part of the fixing post 214, and the other end of the compression spring 219 abuts against a part of the contact 215. Preferably, the isolation device 210 further includes a compression spring shield 2191, which is installed between the contact 215 and the fixing post 214 and shields the compression spring 219.

The isolation device 210 also includes a closing stationary contact 216 fixed to a closing bushing and a grounded stationary contact 217 fixed to a grounding circuit. When the isolation device 210 is used on the busbar side, the closing bushing is the busbar bushing 120, and the isolation device 210 can be installed close to the busbar bushing 120. When the isolation device 210 is used on the feeder side, the closing bushing is the feeder bushing 510, and the isolation device 210 can be installed close to the feeder bushing 510. The rotation of the drive shaft 211 drives the movable guide rod 213 to swing between a on position and a grounded position. In the on position, the movable guide rod 213 contacts and conducts with the closing stationary contact 216, and the voltage transformer 310 is in the on state. In the grounded position, the movable guide rod 213 contacts and conducts with the grounded stationary contact 217, and the voltage transformer 310 is in the grounded state. Preferably, the isolation device 210 further includes a contact shield 2161, for example, the contact shield 2161 is a closing contact shield that surrounds and shields the closing stationary contact 216 and/or a grounded contact shield that surrounds and shields the grounded stationary contact 217. In the embodiment of FIGS. 10 and 11, the closing stationary contact 216 and the grounded stationary contact 217 respectively include conductive spring pieces 218, and the gap defined between the conductive spring pieces 218 is slightly smaller than the diameter of the contact end 2131 of the movable guide rod 213 formed as a round rod, so that when the movable guide rod 213 swings close to the conductive spring pieces 218, the movable guide rod 213 slides into the gap of the conductive spring pieces 218, spreads the conductive spring pieces 218 and maintains contact with the conductive spring pieces 2131.

The isolation device 210 according to the present disclosure can be used for both the busbar-side voltage transformer cabinet and the feeder-side voltage transformer cabinet with the same structure. That is to say, the isolation device 210 according to the present disclosure can be installed close to the busbar bushing 120 to increase the isolation function for the busbar-side voltage transformer cabinet, or can be installed close to the feeder bushing 510 to increase the isolation function for the feeder-side voltage transformer cabinet. Therefore, for manufacturers, the number of parts can be reduced and the cost can be reduced.

The isolation device 210 for a voltage transformer cabinet and the exemplary implementation of the voltage transformer cabinet including the isolation device 210 are described in detail above with reference to the preferred embodiment. However, it can be understood by those skilled in the art that various variations and modifications can be made to the above specific embodiment without departing from the concept of the present disclosure, and various technical features and structures proposed by the present disclosure can be combined in various ways without exceeding the protection scope of the present disclosure.

The invention claimed is:

1. An isolation device for a voltage transformer cabinet, wherein the isolation device is installed in an inflation chamber of the voltage transformer cabinet and configured to switch a voltage transformer between an on state and a grounded state, and comprises:

a drive shaft, rotatably installed to the inflation chamber;

a conductive ring, sleeved and fixed to the drive shaft;

a movable guide rod, fixed to the drive shaft and the conductive ring to swing along with a rotation of the drive shaft and electrically connected with the conductive ring;

a fixing post, fixedly connected to the voltage transformer;

a contact, installed to the fixing post through a compression spring and electrically connected with the fixing post, and keeping in electrical contact with the conductive ring under an action of the compression spring;

a closing stationary contact, fixed to a closing bushing; and a grounded stationary contact, fixed to a grounding circuit, wherein, the rotation of the drive shaft drives the movable guide rod to swing between an on position and a grounded position, in the on position, the movable guide rod contacts and conducts with the closing stationary contact, and the voltage transformer is in the on state; in the grounded position, the movable guide rod contacts and conducts with the grounded stationary contact, and the voltage transformer is in the grounded state, wherein, the isolation device is suitable for being installed in a busbar-side voltage transformer cabinet to enable the movable guide rod to move and contact the closing stationary contact attached to a busbar bushing of the busbar-side voltage transformer cabinet and switch between the on state and the grounded state of the voltage transformer, and wherein, the isolation device is suitable for being installed in a feeder-side voltage transformer cabinet to enable the movable guide rod to move and contact the closing stationary contact attached to a feeder bushing of the feeder-side voltage transformer cabinet and switch between the on state and the grounded state of the voltage transformer.

2. The isolation device according to claim 1, wherein the isolation device is suitable for being installed close to the busbar bushing and suitable for being installed close to the feeder bushing.

3. The isolation device according to claim 1, wherein the movable guide rod is a round rod, and the closing stationary contact and the grounded stationary contact respectively comprise conductive spring pieces, a gap between the conductive spring pieces is slightly smaller than a diameter of the movable guide rod, so that when the movable guide rod swings close to the conductive spring pieces, the movable guide rod slides into the gap, spreads the conductive spring pieces and keeps in contact with the conductive spring pieces.

4. The isolation device according to claim 1, wherein, the drive shaft is provided with a radial through hole;

the conductive ring is provided with a threaded through hole radially opened and a blind hole radially opposite to the threaded through hole and opened towards the threaded through hole; and the movable guide rod is a round rod, and includes a contact end configured to contact with the closing stationary contact or the grounded stationary contact and a fixed end opposite to the contact end, a threaded section is arranged at a distance from the fixed end, wherein the movable guide rod simultaneously passes through the threaded through hole of the conductive ring and the radial through hole of the drive shaft, the threaded section is connected with the threaded through hole in a matching way, the movable guide rod passes through the fixed end of the drive shaft and is clamped into the blind hole of the conductive ring.

5. The isolation device according to claim 4, wherein a diameter of a fixed section between the threaded section and the fixed end is smaller than a diameter of the contact end.

6. The isolation device according to claim 1, wherein:

in the busbar-side voltage transformer cabinet, the closing bushing is a busbar bushing, and the isolation device is installed close to the busbar bushing; and in the busbar-side voltage transformer cabinet, the closing bushing is a feeder bushing, and the isolation device is installed close to the feeder bushing.

7. The isolation device according to claim 1, wherein the isolation device further comprises a compression spring shield, the compression spring shield is installed between the contact and the fixing post and shields the compression spring.

8. The isolation device according to claim 1, wherein the isolation device further comprises a closing contact shield surrounding and shielding the closing stationary contact and/or a grounded contact shield surrounding and shielding the grounded stationary contact.

9. The isolation device according to claim 1, wherein three conductive rings and three movable guide rods are spaced apart and fixed on the drive shaft.

10. The isolation device according to claim 1, wherein the fixing post is fixed to a transformer bushing connected with the voltage transformer or a connection copper bar connected with the transformer bushing.

11. A busbar-side voltage transformer cabinet, comprising:

a busbar chamber including a busbar;

an inflation chamber;

a voltage transformer; and an isolation device installed in the inflation chamber and connected to the voltage transformer, the isolation device including:

a drive shaft, rotatably installed to the inflation chamber;

a conductive ring, sleeved and fixed to the drive shaft;

a movable guide rod, fixed to the drive shaft and the conductive ring to swing along with a rotation of the drive shaft and electrically connected with the conductive ring;

a fixing post, fixedly connected to the voltage transformer;

a contact, installed to the fixing post through a compression spring and electrically connected with the fixing post, and keeping in electrical contact with the conductive ring under an action of the compression spring;

a busbar bushing, connected to the busbar and extending from the busbar chamber into the inflation chamber;

a closing stationary contact, fixed to the busbar bushing; and a grounded stationary contact, fixed to a grounding circuit, wherein, the rotation of the drive shaft drives the movable guide rod to swing between an on position and a grounded position, in the on position, the movable guide rod contacts and conducts with the closing stationary contact, and the voltage transformer is in an on state; in the grounded position, the movable guide rod contacts and conducts with the grounded stationary contact, and the voltage transformer is in the grounded state.

12. The busbar-side voltage transformer cabinet according to claim 11, wherein the inflation chamber is filled with dry air, the voltage transformer cabinet has a same height, a same width, and a same depth with an electrical cabinet filled with SF6 gas and having no voltage transformer isolation function.

13. A feeder-side voltage transformer cabinet, comprising:

an inflation chamber;

a voltage transformer; and an isolation device installed in the inflation chamber and connected to the voltage transformer, the isolation device including:

a drive shaft, rotatably installed to the inflation chamber;

a conductive ring, sleeved and fixed to the drive shaft;

a movable guide rod, fixed to the drive shaft and the conductive ring to swing along with a rotation of the drive shaft and electrically connected with the conductive ring;

a fixing post, fixedly connected to the voltage transformer;

a contact, installed to the fixing post through a compression spring and electrically connected with the fixing post, and keeping in electrical contact with the conductive ring under an action of the compression spring;

a feeder bushing, connected to a feeder and extending into the inflation chamber;

a closing stationary contact, fixed to the feeder bushing; and a grounded stationary contact, fixed to a grounding circuit, wherein, the rotation of the drive shaft drives the movable guide rod to swing between an on position and a grounded position, in the on position, the movable guide rod contacts and conducts with the closing stationary contact, and the voltage transformer is in an on state; in the grounded position, the movable guide rod contacts and conducts with the grounded stationary contact, and the voltage transformer is in the grounded state.

14. The feeder-side voltage transformer cabinet according to claim 13, wherein the inflation chamber is filled with dry air, the voltage transformer cabinet has a same height, a same width, and a same depth with an electrical cabinet filled with SF6 gas and having no voltage transformer isolation function.

* * * * *